(12) United States Patent
Woodland et al.

(10) Patent No.: US 11,427,201 B2
(45) Date of Patent: Aug. 30, 2022

(54) BRAKING CONTROL SYSTEM FOR A HYBRID OR ELECTRIC VEHICLE

(71) Applicant: FORD GLOBAL TECHNOLOGIES, LLC, Dearborn, MI (US)

(72) Inventors: Brandon Jay Woodland, Livonia, MI (US); Zachary March, Pinckney, MI (US); Bryan Michael Bolger, Canton, MI (US); Joseph James Gallo, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 17/115,885

(22) Filed: Dec. 9, 2020

(65) Prior Publication Data
US 2022/0176967 A1    Jun. 9, 2022

(51) Int. Cl.
| | |
|---|---|
| *B60W 10/30* | (2006.01) |
| *B60W 30/18* | (2012.01) |
| *F16D 63/00* | (2006.01) |
| *B60T 1/16* | (2006.01) |
| *B60T 1/02* | (2006.01) |

(Continued)

(52) U.S. Cl.
CPC ....... *B60W 30/18181* (2013.01); *B60K 11/04* (2013.01); *B60L 7/24* (2013.01); *B60T 1/02* (2013.01); *B60T 1/16* (2013.01); *B60W 10/08* (2013.01); *B60W 10/18* (2013.01); *B60W 10/184* (2013.01); *B60W 10/30* (2013.01); *B60W 30/18109* (2013.01); *B60W 30/18127* (2013.01); *F16D 63/00* (2013.01); *B60K 26/02* (2013.01); *B60T 7/04* (2013.01); *B60T 2270/604* (2013.01); *B60W 2540/10* (2013.01); *B60W 2540/12* (2013.01); *B60W 2710/08* (2013.01);

(Continued)

(58) Field of Classification Search
CPC ........... B60W 30/18181; B60W 10/08; B60W 10/18; B60W 10/184; B60W 10/30; B60W 2540/10; B60W 2710/08; B60W 2710/18; B60W 2710/30; B60W 2540/12; B60W 30/18109; B60W 30/18127; B60K 11/04; B60T 1/16; B60T 2270/604
See application file for complete search history.

(56) References Cited

U.S. PATENT DOCUMENTS

| | | | |
|---|---|---|---|
| 10,369,888 B2 | 8/2019 | Kuang et al. | |
| 2010/0105520 A1* | 4/2010 | Ohbayashi | B60W 10/184 477/23 |

(Continued)

FOREIGN PATENT DOCUMENTS

| | | | |
|---|---|---|---|
| CN | 110385997 A | | 10/2019 |
| JP | 2017136899 A | * | 8/2017 |
| KR | 20210156887 | * | 12/2021 |

*Primary Examiner* — Roger L Pang
(74) *Attorney, Agent, or Firm* — David B Kelley; Brooks Kushman P.C.

(57) ABSTRACT

A vehicle includes active grill shutters and a controller. The active grill shutters are configured to open to increase a drag on the vehicle and to close to decrease the drag on the vehicle. The controller is programmed to, in response to regenerative braking via an electric machine and an absence of friction braking, transition or maintain the active grill shutters to or in a closed position. The controller is further programmed to, in response to friction braking, transition or maintain the active grill shutters to or in the open position.

20 Claims, 2 Drawing Sheets

(51) Int. Cl.
*B60L 7/24* (2006.01)
*B60W 10/08* (2006.01)
*B60W 10/18* (2012.01)
*B60W 10/184* (2012.01)
*B60K 11/04* (2006.01)
*B60K 26/02* (2006.01)
*B60T 7/04* (2006.01)

(52) U.S. Cl.
CPC ..... *B60W 2710/18* (2013.01); *B60W 2710/30* (2013.01)

(56) References Cited

U.S. PATENT DOCUMENTS

2019/0106103 A1   4/2019   Inoue et al.
2021/0245720 A1*  8/2021   Kava ..................... B62D 37/02

* cited by examiner

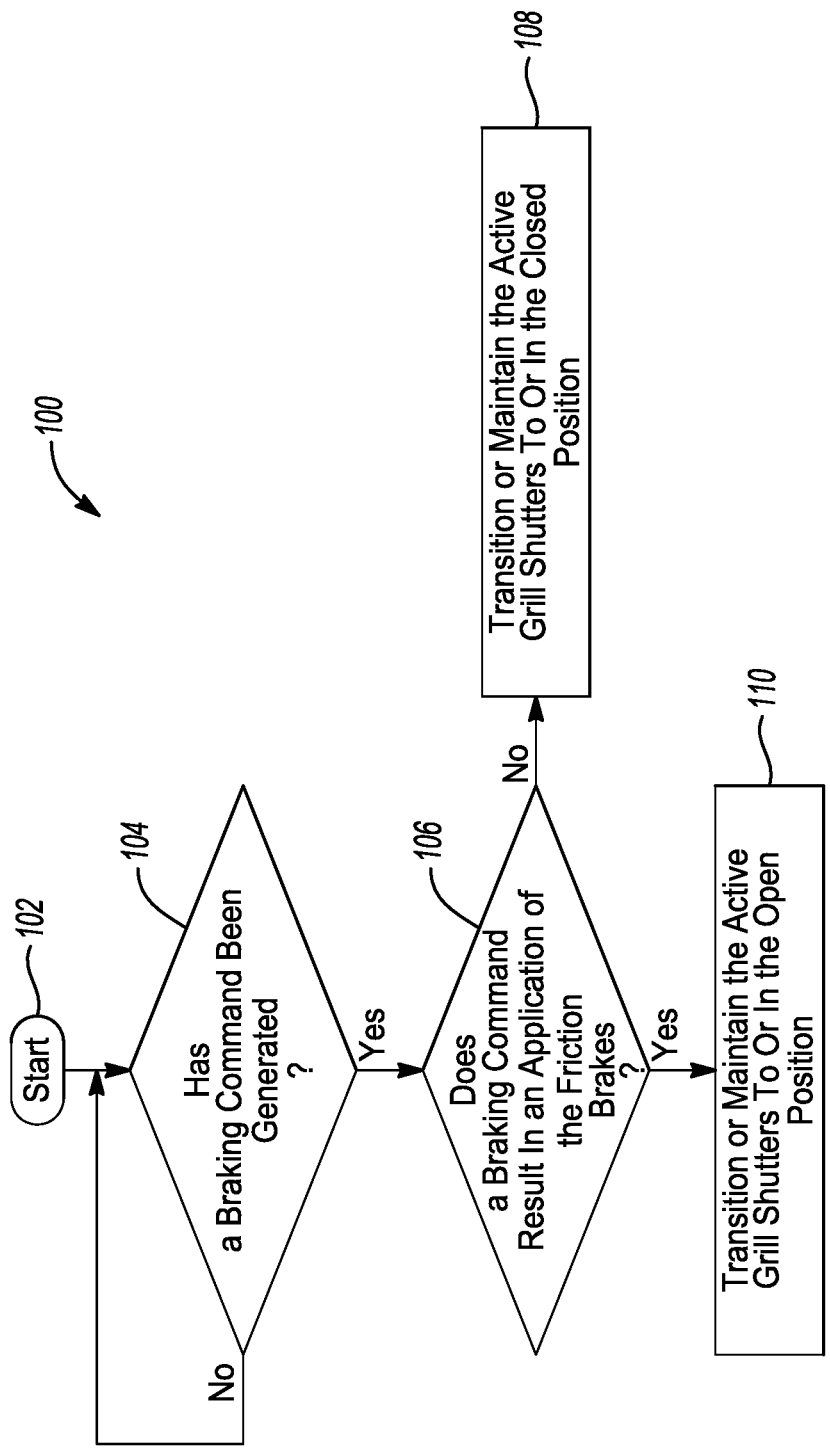

BRAKING CONTROL SYSTEM FOR A HYBRID OR ELECTRIC VEHICLE

TECHNICAL FIELD

The present disclosure relates to hybrid or electric vehicles and control systems for hybrid or electric vehicles.

BACKGROUND

Hybrid and electric vehicles may include an electric machine that is configured to propel the vehicle.

SUMMARY

A vehicle includes active grill shutters and a controller. The active grill shutters are configured to open to increase a drag on the vehicle and to close to decrease the drag on the vehicle. The controller is programmed to, in response to regenerative braking via an electric machine and an absence of friction braking, transition or maintain the active grill shutters to or in a closed position. The controller is further programmed to, in response to friction braking, transition or maintain the active grill shutters to or in the open position.

A vehicle includes an electric machine, friction brakes, shutters, and a controller. The electric machine is configured to brake the vehicle via regenerative braking. The friction brakes are also configured to brake the vehicle. The shutters are configured to open to increase a drag on the vehicle and to close to decrease the drag on the vehicle. The controller is programmed to, close the shutters based on a utilization of regenerative braking and an absence of friction braking. The controller is further programmed to open the shutters based on a utilization of friction braking.

A vehicle includes an accelerator pedal, a brake pedal, an electric machine, friction brakes, active grill shutters, and a controller. The electric machine is configured to propel the vehicle in response to depressing the accelerator pedal. The electric machine is also configured to brake the vehicle via regenerative braking in response to depressing the brake pedal or in response to releasing the accelerator pedal according to a one-pedal driving operation. The friction brakes are configured to brake the vehicle in response to depressing the brake pedal or in response to releasing the accelerator pedal according to the one-pedal driving operation. The active grill shutters are configured to direct air across a heat exchanger when in an open position, wherein the active grill shutters increase an aerodynamic drag on the vehicle when in the open position relative to a closed position of the active grill shutters. The controller is programmed to, in response to releasing the accelerator, an increase in regenerative braking, and an absence friction braking, transition or maintain the active grill shutters to or in the closed position. The controller is further programmed to, in response to depressing the brake pedal, an increase in regenerative braking, and an absence friction braking, transition or maintain the active grill shutters to or in the closed position. The controller is further programmed to, in response to releasing the accelerator pedal and an increase in friction braking, transition or maintain the active grill shutters to or in the open position. The controller is further programmed to, in response to depressing the brake pedal and an increase in friction braking, transition or maintain the active grill shutters to or in the open position.

BRIEF DESCRIPTION OF THE DRAWINGS

FIG. 2 is a flowchart illustrating a method for controlling the vehicle during a braking operation.

DETAILED DESCRIPTION

Figure 1:
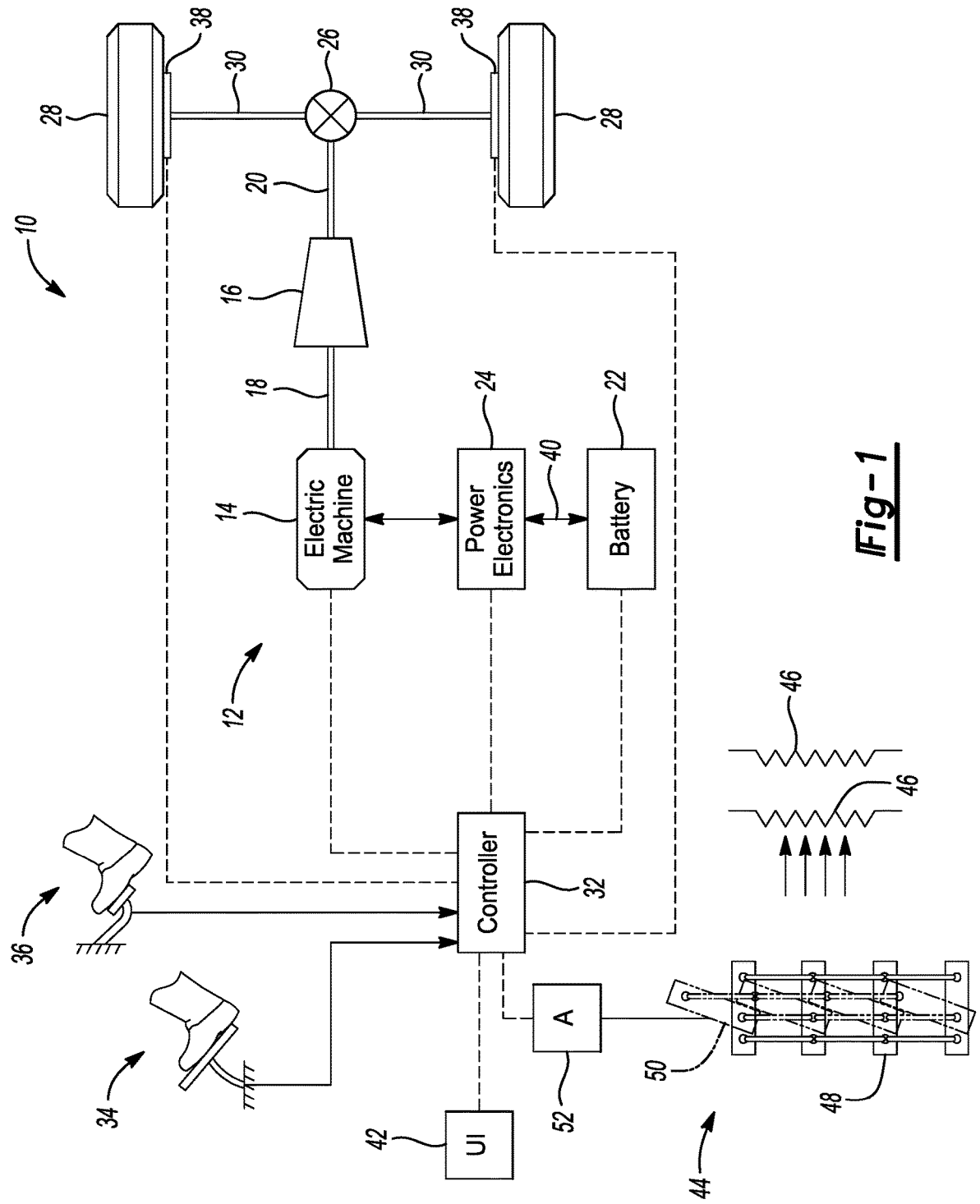
FIG. 1 is a schematic illustration of a representative powertrain of an electric vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission or a continuously variable transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The M/G 14 is configured to deliver power to the wheels 28 to drive the vehicle 10 via the various connections described above. It should be understood that the connections between the M/G 14 and the wheels 28 described herein is for illustrative purposes only and that other drivetrain configurations between the M/G 14 and the wheels 28 may be implemented in the alternative.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or torque, or a demand for decreased power or torque, respectively. Stated in other terms, increasing an amount of depression of the accelerator pedal is configured to generate a command to increase the speed of the vehicle 10 while decreasing an amount of depression of the accelerator pedal is configured to generate a command to decrease the speed of the vehicle 10. A brake pedal 36 is also used by the driver of the vehicle to provide a demanded braking torque to slow or decrease the speed of the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The friction brakes 38 are configured to apply torque to the wheels in response to depression of the brake pedal 36 in order to slow or brake the vehicle 10. The controller 32 also controls the timing of gear shifts within the transmission 16.

The M/G 14 may act as a motor and provide a driving force for the powertrain 12. To drive or propel the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22. Regenerative braking also results in slowing or braking the vehicle.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include a one-pedal drive mode or system. In the one-pedal drive mode, the speed of the vehicle may be increased in response to increasing a depressed position of the accelerator pedal 34 while releasing the accelerator pedal 34 results in braking the vehicle 10 via regenerative braking through the M/G 14, via friction braking through the friction brakes 38, or a combination of regenerative braking and friction braking. More specifically, the vehicle 10 may be slowed or braked, including bringing the vehicle 10 to a complete stop, via releasing the accelerator pedal 34 alone without an application or depression of the brake pedal 36. In any mode, depressing the brake pedal 36 may also result in braking the vehicle 10 via regenerative braking through the M/G 14, via friction braking through the friction brakes 38, or a combination of regenerative braking and friction braking.

The vehicle 10 may include a user interface 42, such as control panel, touch screen, push button, etc. that is in communication with the controller 32. The controller 32 may be configured to enable and disable the one-pedal driving mode based on an operator selected input from the user interface 42.

The vehicle includes active grill shutters 44 that are configured to direct air across heat exchangers 46 when in an open position 48. In a closed position 50 the active grill shutters 44 are configured to restrict or prevent air from being directed across the heat exchangers 46. More specifically, the air may be directed around the body of the vehicle 10 when the active grill shutters 44 are in the closed position 50, which results in less aerodynamic drag on the vehicle 10 relative to when the active grill shutters 44 are directing air across the heat exchangers 46. The first of the heat exchangers 46 may be a radiator that is configured to cool an engine coolant and a second of the heat exchangers 46 may be a condenser for an air conditioning system or a battery cooling system. The active grill shutters 44 may include an actuator 52, such a servo motor, an electric solenoid, a pneumatic cylinder, a hydraulic cylinder, etc., that is configured to transition the active grill shutters 44 between the open position 48 and the closed position 50. The actuator 52 may be in communication with and controlled by the controller 32.

The active grill shutters 44 may increase an aerodynamic drag on the vehicle 10 when in the open position 48 and may decrease aerodynamic drag on the vehicle 10 when in the closed position 50. The active grill shutters 44 may be utilized to increase vehicle efficiency. The active grill shutters 44 may be positioned in front of the radiator and the air conditioning condenser (i.e., heat exchangers 46). When increased air flow is needed across the heat exchangers 46, the active grill shutters 44 are opened to increase air flow. When increased air flow is not required, the active grill shutters 44 are closed. Closing the active grill shutters 44 increases the aerodynamic properties of the vehicle 10 (i.e., decreases aerodynamic drag), which increases the efficiency of the vehicle 10.

One-pedal drive (1PD) is a feature, which gives control to the accelerator pedal to increase braking and to bring the vehicle to a stop without input from the brake pedal. The one-pedal drive low speed controller (LSC), which may be part of the one or more controllers that includes controller 32, controls the vehicle to a complete stop by adjusting the powertrain torque when the vehicle is in a one-pedal drive mode and the customer has tipped out of the accelerator pedal.

Since opening the active grill shutters 44 increases aerodynamic drag, it may also be desirable to open the active grill shutters 44 when the friction brakes 38 are applied. This decreases the load on the friction brakes 38 while opportunistically providing increased airflow to the heat exchangers 46. On the other hand, it may not be desirable to increase aerodynamic drag during regenerative braking because the increased aerodynamic drag reduces the amount of energy that may be recovered.

Referring to FIG. 2, a flowchart for controlling the vehicle 10 during a braking operation is illustrated. The method 100 may be stored as control logic and/or an algorithm within the controller 32. The controller 32 may implement the method 100 by controlling the various components of the vehicle 10. The method 100 is initiated at start block 102. The method 100 may be initiated at start block 102 by turning a start key or ignition of the vehicle 10 to an "on" position. The method 100 then moves on to block 104 where it is determined if a braking command has been generated. The braking command may be generated by either releasing the accelerator pedal 34 in a one-pedal drive mode or by depressing the brake pedal 36. If the answer at block 104 is NO, the method 100 recycles back to the beginning of block 104. If the answer at block 106 is YES, the method moves on to block 106.

At block 106 it is determined if the braking command generated at block 104 results in a significant application of the friction brakes 38. Friction braking torque may be deemed significant when it exceeds a calibratable threshold. An application of the friction brakes 38 may refer to applying or increasing a braking torque of the friction brakes 38. If the answer at block 106 is NO, it is indicative that the braking command only results in an application or of an increase in regenerative braking (i.e., a regenerative braking torque is applied or increased via the M/G 14 in an absence of friction braking torque or while friction braking torque is zero). Also, if the answer at block 106 is NO, the method 100 moves on to block 108 where the active grill shutters 44 are transitioned to or maintained in the closed position 50.

If the answer at block 106 is YES, the friction brakes 38 are applied (i.e., a braking torque of the friction brakes 38 is applied or increased) or both the friction brakes 38 and regenerative braking are applied (i.e., the braking torque of the friction brakes 38 is applied or increased and the regenerative braking torque of the M/G 14 is applied or increased). Also, if the answer at block 106 is YES, the method 100 moves on to block 110 where the active grill shutters 44 are transitioned to or maintained in the open position 48.

It should be noted that the method 100 may include a priority request to open or close the active grill shutters 44 that may supersede the decision at block 106. For example, such a priority request may be an increase in the desired cooling of the heat exchangers 46, which would result in the active grill shutters 44 being maintained in or transitioned to the open position 48. As another example, such a priority request may be a decrease in the desired cooling of the heat exchangers 46, which would result in the active grill shutters 44 being maintained in or transitioned to the closed position 50.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should further be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   active grill shutters configured to open to increase a drag on the vehicle and to close to decrease the drag on the vehicle; and
   a controller programmed to, in response to regenerative braking via an electric machine and an absence of friction braking, transition or maintain the active grill shutters to or in a closed position, and in response to friction braking, transition or maintain the active grill shutters to or in an open position.

2. The vehicle of claim 1, wherein the controller is further programmed to, in response to both regenerative braking and friction braking, transition or maintain the active grill shutters to or in the open position.

3. The vehicle of claim 1 further comprising an accelerator pedal, and wherein the electric machine is configured to propel the vehicle in response to depressing the accelerator pedal and to brake the vehicle via regenerative braking in response to releasing the accelerator pedal according to a one-pedal driving operation.

4. The vehicle of claim 3, wherein the controller is further programmed to, in response to releasing the accelerator, an increase in regenerative braking, and an absence of friction braking, transition or maintain the active grill shutters to or in the closed position.

5. The vehicle of claim 3, wherein the controller is further programmed to, in response to releasing the accelerator, an increase in regenerative braking, and an increase in friction braking, transition or maintain the active grill shutters to or in the open position.

6. The vehicle of claim 3, wherein the controller is further programmed to, in response to releasing the accelerator, an increase in friction braking, and an absence of regenerative braking, transition or maintain the active grill shutters to or in the open position.

7. The vehicle of claim 1 further comprising a brake pedal, and wherein the electric machine is configured to brake the vehicle via regenerative braking or friction brakes are configured to brake the vehicle in response to depressing the brake pedal.

8. The vehicle of claim 7, wherein the controller is further programmed to, in response to depressing the brake pedal, an increase in regenerative braking, and an absence of friction braking, transition or maintain the active grill shutters to or in the closed position.

9. The vehicle of claim 7, wherein the controller is further programmed to, in response to depressing the brake pedal, an increase in regenerative braking, and an increase in friction braking, transition or maintain the active grill shutters to or in the open position.

10. The vehicle of claim 7, wherein the controller is further programmed to, in response to depressing the brake pedal, an increase in friction braking, and an absence of regenerative braking, transition or maintain the active grill shutters to or in the open position.

11. A vehicle comprising:
an electric machine configured to brake the vehicle via regenerative braking;
friction brakes configured to brake the vehicle;
shutters configured to open to increase a drag on the vehicle and to close to decrease the drag on the vehicle; and
a controller programmed to,
close the shutters based on a utilization of regenerative braking and an absence of friction braking, and
open the shutters based on a utilization of friction braking.

12. The vehicle of claim 11, wherein the controller is further programmed to, open the shutters based on a utilization of both regenerative and friction braking.

13. The vehicle of claim 11 further comprising an accelerator pedal and a brake pedal, wherein the electric machine is configured to propel the vehicle in response to depressing the accelerator pedal and to brake the vehicle via regenerative braking in response to releasing the accelerator pedal according to a one-pedal driving operation, and wherein the electric machine is configured to brake the vehicle via regenerative braking in response to depressing the brake pedal or the friction brakes are configured to brake the vehicle in response to depressing the brake pedal.

14. The vehicle of claim 13, wherein the controller is further programmed to, in response to releasing the accelerator, an increase in regenerative braking, and an absence of friction braking, close the shutters.

15. The vehicle of claim 13, wherein the controller is further programmed to, in response to releasing the accelerator, an increase in regenerative braking, and an increase in friction braking, open the shutters.

16. The vehicle of claim 13, wherein the controller is further programmed to, in response to releasing the accelerator, an increase in friction braking, and an absence of regenerative braking, open the shutters.

17. The vehicle of claim 13, wherein the controller is further programmed to, in response to depressing the brake pedal, an increase in regenerative braking, and an absence of friction braking, close the shutters.

18. The vehicle of claim 13, wherein the controller is further programmed to, in response to depressing the brake pedal, an increase in regenerative braking, and an increase in friction braking, open the shutters.

19. The vehicle of claim 13, wherein the controller is further programmed to, in response to depressing the brake pedal, an increase in friction braking, and an absence of regenerative braking, open the shutters.

20. A vehicle comprising:
an accelerator pedal;
a brake pedal;
an electric machine configured to propel the vehicle in response to depressing the accelerator pedal and to brake the vehicle via regenerative braking in response to depressing the brake pedal or in response to releasing the accelerator pedal according to a one-pedal driving operation;
friction brakes configured to brake the vehicle in response to depressing the brake pedal or in response to releasing the accelerator pedal according to the one-pedal driving operation;
active grill shutters configured to direct air across a heat exchanger when in an open position, wherein the active grill shutters increase an aerodynamic drag on the vehicle when in the open position relative to a closed position of the active grill shutters; and
a controller programmed to,
in response to releasing the accelerator pedal, an increase in regenerative braking, and an absence of friction braking, transition or maintain the active grill shutters to or in the closed position,
in response to depressing the brake pedal, an increase in regenerative braking, and an absence of friction braking, transition or maintain the active grill shutters to or in the closed position,
in response to releasing the accelerator pedal and an increase in friction braking, transition or maintain the active grill shutters to or in the open position, and
in response to depressing the brake pedal and an increase in friction braking, transition or maintain the active grill shutters to or in the open position.

* * * * *